United States Patent [19]

Bauman

[11] 3,737,020
[45] June 5, 1973

[54] APPARATUS FOR FEEDING GLASS RODS

[75] Inventor: Francis E. Bauman, Vineland, N.J.

[73] Assignee: Owens-Illinois, Inc., Toledo, Ohio

[22] Filed: Dec. 31, 1970

[21] Appl. No.: 103,326

[52] U.S. Cl. ................................. 198/22 R, 198/25
[51] Int. Cl. ....................... B65g 47/06, B65g 47/80
[58] Field of Search ............... 198/19, 22 R, 31 AA, 198/22 B, 25–26, 107, 31 AB, 31 AC; 221/9–10, 234, 266

[56] References Cited

UNITED STATES PATENTS

| 2,285,267 | 6/1942 | Gantzer | 198/22 |
|---|---|---|---|
| 2,881,918 | 4/1959 | Cunha | 198/22 X |
| 1,419,324 | 6/1922 | Stender | 198/31 AB |

FOREIGN PATENTS OR APPLICATIONS 111,654  8/1964  Czechoslovakia ............... 198/31 AA Primary Examiner—Edward A. Sroka
Attorney—Edward J. Holler and David R. Birchall

[57] ABSTRACT

An apparatus for feeding glass tubes to a machine that severs the tubes to a prescribed length. The apparatus includes a plurality of storage racks for storing the glass tubes prior to their advancement. An advancement wheel that moves the tubes one at a time along a curvilinear path to a transfer point where the glass tubes are, either singularly or in pairs, deposited in holding guides that permit the glass tubes to move in a longitudinal direction as they are consumed by the severing machine. The invention also incorporates a finger arrangement that effects a very rapid horizontal translation of the glass tubes while they are maintained in vertical alignment.

6 Claims, 4 Drawing Figures

Patented June 5, 1973

INVENTOR.
Francis E. Bauman
BY D. R. Birkall
C. J. Holler
ATTORNEYS

APPARATUS FOR FEEDING GLASS RODS

This invention relates generally to an apparatus for feeding long lengths of fairly small diameter glass tubes to a machine that severs the glass tubes to a prescribed length. More particularly, the present invention relates to the rapid transfer of a vertically aligned glass tube to a rotary glass vial forming machine.

It is common practice in the vial and ampule forming industry to manufacture small containers from lengths of drawn glass tubing. The desired length of glass tubing for the fabrication of, for example a single vial, is severed from a long length of glass tubing and through subsequent manipulative work steps a bottom is formed on the vial as well as the desired constriction at the opening of the vial. In a similar manner, long lengths of small glass tubing are manufactured into ampules. The tubing is severed into prescribed lengths that are then elongated in part to form the neck portion of the ampule.

The individual lengths of glass tubing that are ultimately formed into small containers such as vials and ampules are cut and partially fabricated on machinery that incorporates a revolving turret. The turret has a large number of glass tube holding chucks positioned around the arcuate extent of the turret. Associated with each chuck are various work stations in relatively fixed position below the turret which either rotates continuously or is indexed from station to station. At each work station a single or multiple operation is performed upon the glass tubing which may or may not be disengaged from the stock of long glass tubing from which each shorter length of tubing is severed.

For example, in a typical manufacturing operation, the glass tubing is dropped by gravity or other motivating means a prescribed distance through the jaws of the chuck. As the chuck carries the glass tubing with the tubing end protruding therebelow, the tubing is brought before a revolving cutting wheel that scores the glass tubing on one side or completely around the circumferential extent of the tubing provided that the chuck is of the type that revolves about its own central axis. After the glass tubing has been scored, it is then heated in the vicinity of the score line while at another station. Following the heating of the glass tube, it is advanced to yet another station where a cooling fluid is sprayed upon the score line whereupon the glass tube fractures along the score line. The severed piece of glass tube is then additionally worked upon at additional stations or else is transported to other specialized machinery for final fabrication into vials.

It thus becomes apparent that the turret type of glass vial manufacturing machine requires large amounts of glass tubing in order to operate all of the chucks of a multiple head turret type manufacturing operation. Heretofore, in order to satisfy the demand for glass tubing, the machine was fed by hand. An operator would stand beside the machine and as a chuck became empty, a new length of glass tubing was inserted into the top side of the chuck. This method of loading the machine required constant attention from the operator. If the operator was not immediately available to insert a new supply of glass tubing to an empty chuck at just the right time, the chuck would not be loaded for its trip through the various stations, consequently the machine could not operate at its maximum capacity.

The utilization of hand fed turret type machines became more difficult to operate at maximum efficiency particularly when the speed and diameter of the machine was increased. Not only was a single piece of glass severed from the stock tube in the chuck per each revolution of the turret, but two or more pieces of glass were severed during each revolution of the turret. The manufacturing operation became even more complex when the turret was advanced through two stations at a time. In the advancement of the turret, two stations at a time, identical operations were carried out on each adjacent pair of chucks. In other words, as the turret indexed to a particular station, there were two circular saws to simultaneously score the glass tubes held by each pair of adjacent chucks. The pairs of chucks continued to advance through two work stations at a time with similar manipulative steps being carried out at the same time. Consequently, as a general rule two chucks would exhaust their supply of glass tubing at the same time. This made it even more difficult for the hand fed operation of the machine.

In accordance with the above-described difficulty of hand feeding a turret type vial manufacturing machine, it is an object of the present invention to provide an apparatus that can feed long lengths of small diameter glass tubing to container producing chucks within a short interval of time.

Another object of this invention is the ability to feed one or more glass tubes to a container manufacturing machine either simultaneously or one at a time.

A further object of the invention is the ability to feed glass tubes to a turret machine that indexes glass holding chucks through stations two at a time.

An additional object of the instant invention is to provide an apparatus for loading the chucks of a glass container manufacturing machine so that minimum breakage occurs while quite long lengths of small diameter tubing are translated horizontally while in vertical alignment.

Another object of the invention is to handle the glass tubing so that undue abrasion does not occur as the glass tubing is moved from one location to another on the apparatus and also upon ultimate transfer to the container manufacturing machine.

Further objects, features and advantages of this invention will become apparent from a detailed consideration of the following description, the appended claims and the accompanying drawings.

Broadly, the invention comprises a double seriatim arrangement for the storage of glass tubes that are advanced one by one to a tube loading head which can upon demand deliver one or two tubes to a vial or ampule manufacturing machine. The tube loading head is activated by the close proximity of an empty chuck on the primary vial or ampule manufacturing machine. The loading head comprises a pair of rotating disks that advance the glass tubes from the storage area to a location opposite the chucks. At the prescribed time, the apparatus, through the action of lever system, thrusts a vertically aligned glass tube into the confinement of the grasping and alignment mechanism associated with the chuck on the vial or ampule manufacturing machine. The invention also utilizes a safety arrangement that prevent inadvertent dislodgment of the glass tube from the loading head before the act of transfer is achieved. The loading head is motivated through a series of gears and cams that in turn are activated and controlled by electrical motors. Sensing and switching means are also coupled with the present invention so that the apparatus is activated only when it is confronted with the presence of an empty chuck on the vial or ampule making machine.

A presently preferred embodiment of the invention is hereinafter described in conjunction with the illustrations contained in the accompanying drawings in which.

Figure 1:
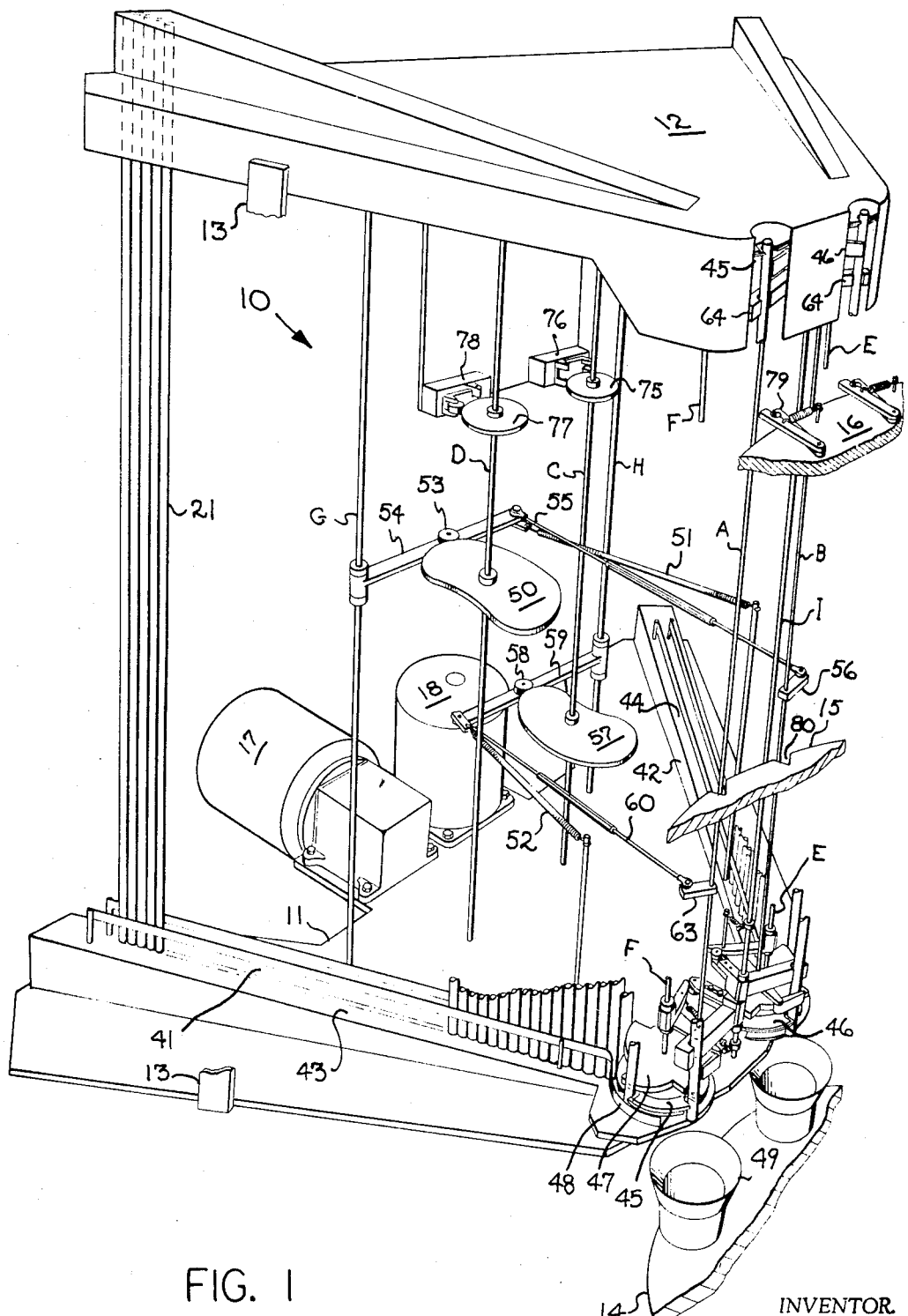
FIG. 1 is a perspective view of the overall apparatus which shows the storage of the glass tubes as well as the tube loading head mechanism.

With reference to the drawings, there is illustrated in FIG. 1 a perspective view of the present invention shown generally at 10. The invention or apparatus 10 is of upright configuration and comprises a base plate 11 that is aligned in a generally horizontal attitude. A top plate 12 is situated at the top of apparatus 10 at quite some distance from base plate 11. The top plate 12 is of a configuration similar to base plate 11. Plates 11 and 12 are held in spaced apart relationship with one another by conventional vertical frame means such as 13 which have been omitted almost entirely from the drawings in order that the more essential features of the invention may be shown more clearly.

Also shown in FIG. 1 are those portions of the turret type glass vial manufacturing machine that receive the glass tubing from the apparatus of the present invention. The vial manufacturing machine forms no part of the present invention and only those portions that are necessary for a complete understanding of the invention are shown. The turret 14 is of arcuate configuration and is horizontally mounted for movement about a vertically aligned central spindle. Associated with the same spindle (not shown) that passes through the center of turret 14 is star wheel 15 which is positioned above turret 14. An upper positioning disk 16 is also aligned on the spindle previously mentioned. The positioning disk is spaced at a considerable distance above star wheel 15.

In general, glass tubes 21 are fed from apparatus 10 to the adjacent vial manufacturing machine which is depicted only in part. The glass tubes 21 must be moved swiftly from apparatus 10 to the vial machine. The glass tubes 21 are delivered in an upright and vertical alignment within a fraction of a second. Glass tubes 21 range from 4 to 6 feet in length and have external diameters of from one-fourth to one inch. It will be appreciated that the rapid handling of the glass tubes 21 thus described requires a smoothly coordinated apparatus in order to prevent breakage of the glass tubes.

Figure 2:
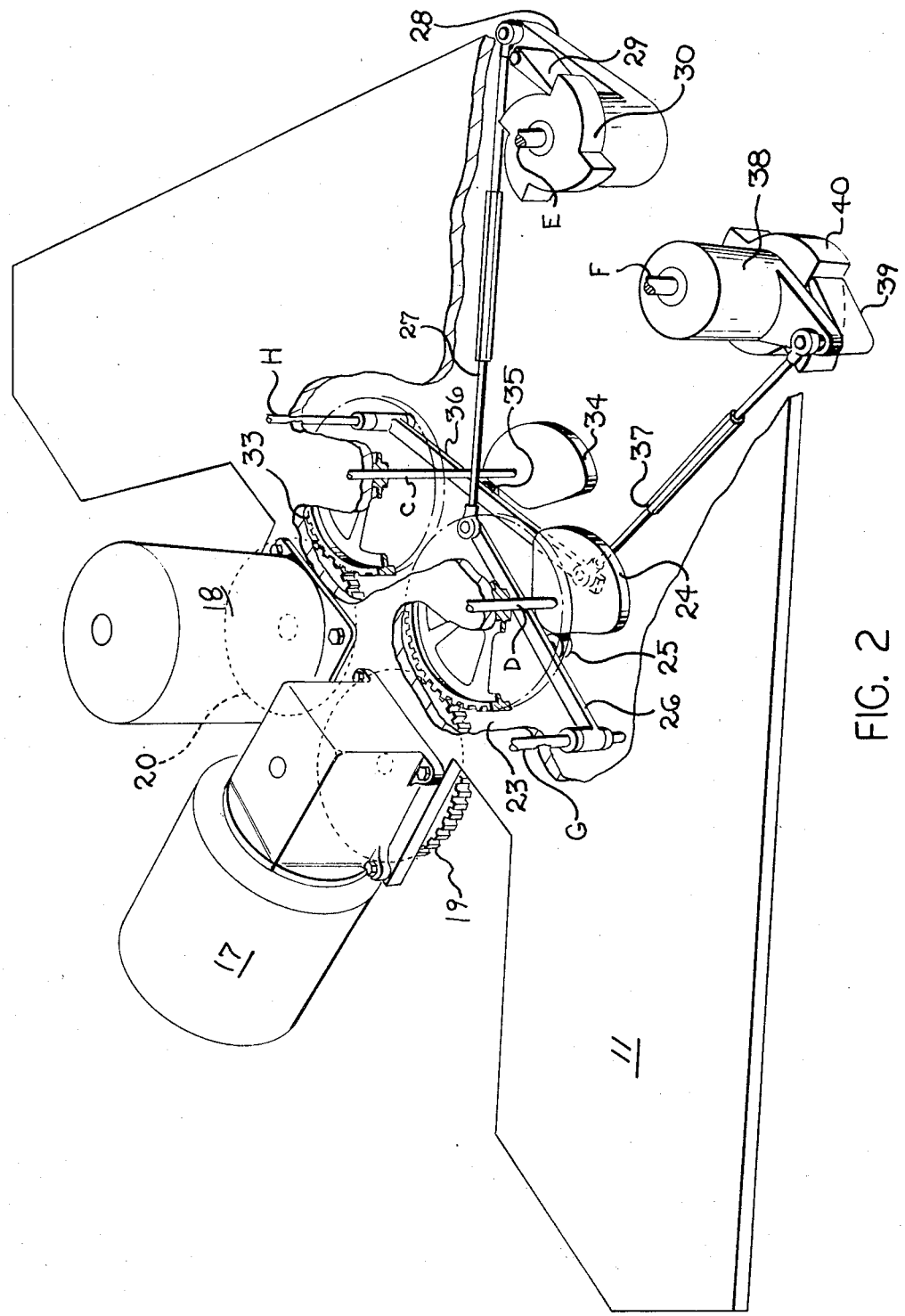
FIG. 2 is a broken away perspective view that shows the drive mechanism coupled to the motors and then to the head rotating means.

FIG. 2, which is a perspective view part in cross section, shows base plate 11 and the mechanism attached thereto. Motors 17 and 18 are anchored to the top of base plate 11. Vertically aligned drive shafts (not shown) protrude downwardly through base plate 11 and have attached respectively thereto drive gears 19 and 20. Drive gear 19 engages with gear 23 which is firmly keyed to shaft D. Shaft D is aligned vertically and extends not only below base plate 11, but also extends to top plate 12 where the top end is journaled. A cam wheel 24 is also rigidly fixed to shaft D at an elevation lower than gear 23. A similar cam wheel is positioned at the extreme top of shaft D just below top plate 12, however, it is not shown. A cam follower 25 coacts with the programmed periphery of cam wheel 24. Cam follower 25 is mounted from an attachment fitting on arm 26 which is in turn journaled from shaft G. Shaft G is vertically aligned and extends from base plate 11 to top plate 12. Shaft G is fixed and does not rotate. Arm 26 is moved back and forth as attached cam follower 25 follows the cam surface of cam wheel 24. A connecting rod 27 is journaled from the end of arm 26 that is most remote from the attachment of arm 26 to shaft G. Connecting rod 27 runs from the end of arm 26 to the outstanding leg of fitment 28 which is journaled for movement about vertically aligned shaft E. The outstanding leg of fitment 28 contains a dog 29 that is pinned at one end and spring biased at the other end for engagement with ratchet wheel 30. Ratchet wheel 30 is keyed rigidly to shaft E which extends in a vertical direction to top plate 12 where its uppermost end is journaled.

Returning now to motor 17, it can be determined that as gear 19 is driven, gear 23 will revolve about shaft D. As cam 24 revolves with shaft D, co-acting cam follower 25 will cause arm 26 to move in an arcuate path about shaft G. Since connecting rod 27 is attached to the end of arm 26, it will cause fitment 28 to rotate about shaft E. As fitment 28 rotates, the end of dog 29 pushes against one of the notches on ratchet wheel 30 thus causing it to revolve a prescribed amount. The revolving of ratchet wheel 30 causes shaft E to also revolve throughout a prescribed angular extent.

In a similar manner, motor 18 revolves thus driving gear 20 which is trained with gear 33. Shaft C is caused to rotate thus revolving cam wheel 34. The rotation of cam wheel 34, associated cam follower 35, and arm 36 which is journaled on shaft H causes push rod 37 to move fitment 38 in an arcuate path about shaft F upon which it is journaled. The movement of fitment 38 and dog 39 causes ratchet wheel 40 to rotate shaft F through a prescribed angular extent.

Attention is once again directed to the perspective view of the apparatus as shown in FIG. 1. The glass tubes 21 are arranged in seriatim fashion in racks 41 on one side of the apparatus and 42 on the other side. The movement of the glass tubes from left to right is aided by the inclined plane arrangement upon which the lower end of glass tube 21 rests. The inclined plane arrangement is shown at 43 on the left and 44 on the right. A biasing force (not shown) is also applied to the back of the rows of glass tubes 21. A metering wheel is positioned at the front of each row of glass tubes 21. Metering wheel 45 is positioned foremost in FIG. 1 whereas metering wheel 46 is positioned to the rear and right of metering wheel 45 in FIG. 1. Metering wheel 45 is rigidly attached to shaft F which is driven by the heretofore described ratchet wheel 40. As can be seen, metering wheel 45 has a plurality of pockets cut into the outer periphery. The metering wheel 45 is comprised of two flat disks that can be rotated one with respect to the other so as to narrow or widen the pockets therein. In this manner, various diameter glass tubing can be accommodated. Also associated with metering wheel 45 is spacer wheel 47 that can be fixedly attached to metering wheel 45 to limit the depth that glass tubes 21 can penetrate into the pockets of metering wheel 45.

As viewed in FIG. 1, metering wheel 45 revolves counterclockwise and as it does so, it picks up a glass tube 21 as one of its empty pockets moves into alignment with the row of glass tubes that are aligned on rack 41 and its inclined plane 43. Additional rotation of metering wheel 45 moves glass tube 21 around slide plate 48 which is also of arcuate configuration. The glass tube 21 traverses an arcuate path of approximately 180 degrees. At that point, the glass tube 21 is ready to be delivered to the empty chuck 49 of turret 14.

In order to move glass tube 21 while it is maintained in substantially vertical alignment, shaft F contains near the top thereof (not shown) another metering wheel that has the pockets in alignment with the pockets shown in metering wheel 45.

The delivery mechanism for rapidly and accurately positioning glass tubes 21 over empty chucks such as 49 will be described in the following paragraph.

Shaft D, which is rotated by gear 23 (FIG. 2) has delivery cam wheel 50 (see FIG. 1) rigidly attached thereto. Delivery cam wheel 50 co-acts with cam follower 53 which is supported near the central region of arm 54. Arm 54 is journaled and supported from fixed shaft G. A biasing force is applied to the free end of arm 54 by spring 51. A push rod 55 is pivoted from the free end of arm 54. Push rod 55 connects arm 54 with the end of cantilevered bar 56 which is rigidly attached to vertically aligned rod B. Likewise, shaft C which is driven by gear 33 (FIG. 2) is rigidly fixed to delivery cam wheel 57. Cam wheel 57 causes cam follower 58 to move arm 59 back and forth in an arcuate path around the end of arm 59 which is journaled on fixed shaft H. Push rod 60 is coupled to the end of arm 59 and also to the outwardly extending cantilevered bar 63. Spring 52 keeps cam follower 58 against delivery cam wheel 57. Cantilevered bar 63 is rigidly attached to vertically aligned rod A.

Figure 3:
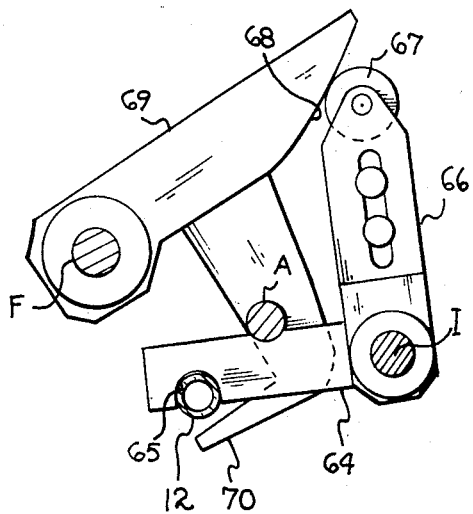
FIG. 3 is an enlarged perspective view of the mechanism that is immediately above the lower glass translating disks.

FIG. 3 is an enlarged perspective view of the mechanism that moves the glass tube 21 from the present invention to the vial manufacturing machine. The apparatus shown in FIG. 3 is also shown on a smaller scale in FIG. 2. Another similar assembly is located at the top of the apparatus and operates concurrently with the about to be described delivery mechanism. Only a minimum amount of the top apparatus is shown. The top delivery assembly was omitted from the drawings for the sake of brevity.

As heretofore pointed out, push rod 60 is attached to bar 63 which in turn is rigidly attached to vertically aligned rod A. The lower terminal of push rod A is journaled against the side of delivery bar 64. A notch or pocket 65 is formed in bar 64 near its free end. The end of bar 64 opposite pocket 65 is journaled on shaft I. The pocket 65 in bar 64 is in vertical alignment with one of the pockets in metering wheel 45. Thus it becomes evident that glass tube 21 fits into pocket 65 when it is in a position for delivery to an empty chuck such as 49. Delivery bar 64 is of bell crank configuration and has bar 66 rigidly attached thereto at generally a right angle. As delivery bar 64 moves about shaft I, so does bar 66 since the two are tied together. A cam roller 67 is mounted on the cantilevered end of bar 66. The cam roller 67 rides against a cam surface 68 on bar 69. Bar 69 is journaled for pivotal movement about shaft F. A rigid finger 70 is attached to and extends generally at 90 degrees to bar 69. The terminal free end of finger 70 extends in front of the glass rod 21 which is indexed in pocket 65 of delivery bar 64. A biasing spring 61 keeps bar 69 against cam roller 67.

During delivery of a glass tube 21 to an empty chuck, rod A is actually moved through an arcuate path about shaft I. Rod A is, of course, mounted top and bottom on delivery bars such as 64. The movement of rod A causes the glass tube 21 to be translated to the adjacent vial manufacturing machine. Just before glass tube 21 is thrust forward, finger 70 is moved from its position in front of the glass tube 21. Finger 70 is used as a safety feature to prevent glass tube 21 from becoming accidentally dislodged from pocket 65 of delivery bar 64.

Figure 4:
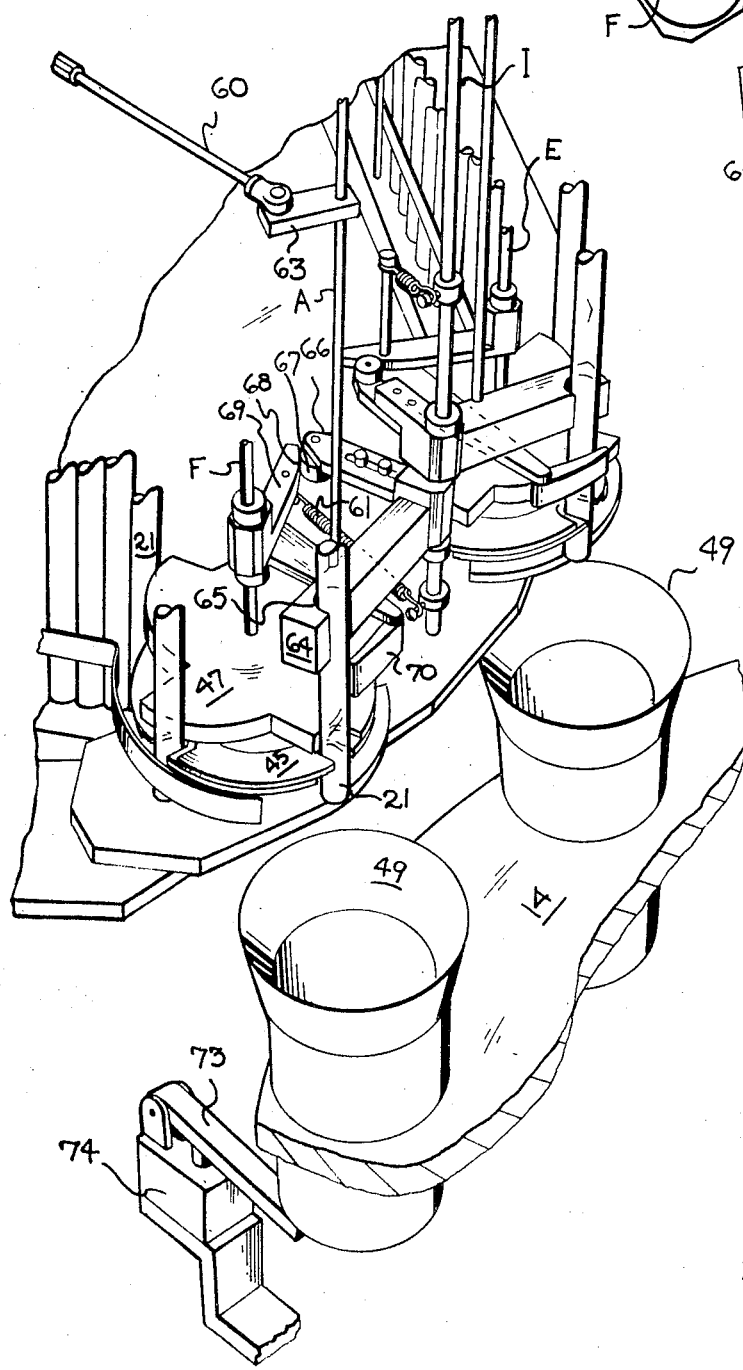
FIG. 4 is a plan view showing in detail the glass tube thrusting mechanism coupled with one of the restraining fingers.

FIG. 4 shows in plan view the interaction between the various elements of the mechanism that is shown in perspective in FIG. 3. Once again, it is to be noted that push rod A swings in an arcuate path about shaft I. Glass tube 21 is shown within the confinement of pocket 65 and finger 70.

During the overall operation of the apparatus of the present invention, the sequence of movement of the various parts are controlled in the following manner. The vial manufacturing machine, which is adjacent the present apparatus, contains glass tube holding chucks 49 which are shown in FIGS. 1 and 3. The glass tube holding chucks 49 are circumferentially spaced about and supported by a rotatable turret 14. As the glass tube is dispensed through the holding chucks, the chucks become empty and in their arcuate travel they pass in front of the glass tube delivery system of the present invention. When the jaws of the chucks are empty, they protrude in a downward direction thus serving as an indicator for activating the feed mechanism of the present invention. Chuck 49 (FIG. 3) comes in contact with switch arm 73. If there is no glass tube in chuck 49, switch arm 73 will be depressed thus activating switch 74. The closing of switch 74 causes the motor, for example, motor 18, to commence running. Motor 18 then, through its associated gears 20 and 33 causes shaft C to rotate as heretofore described. FIG. 1 (at the top) shows switch cam 75 firmly attached to shaft C. One complete revolution of switch cam 75 causes switch 76 to open thus stopping the motor 18. During the complete rotation of switch cam 75, a glass tube 21 is deposited within chuck 49. Switch cam 77 and coacting switch 78 control the stopping of motor 17 in a similar manner. The opening of switch 76 permits switch 74 to be reset for activating the system once again as an empty chuck moves into position in front of metering wheel 45.

Thus it becomes evident from the drawings and the description of the invention that glass tubes are delivered from the present invention to an adjacent vial manufacturing machine while the glass tubes remain in vertical alignment. The glass tubes are thrust forward from the present apparatus and are grasped by the holding mechanism 79 that is radially aligned on positioning disk 16. The glass tube is also aligned and supported by the reentrant portion 80 of star wheel 15. After the transfer of the glass tube has been effected, the glass tube then drops down through the chuck mechanism 49 where it is grasped by chuck jaws.

It is to be realized that the present invention grasps and moves the glass rods not only at the bottom, but also at the top. A mechanism similar to that shown in FIG. 3 is positioned at the upper extent of the apparatus, however, only delivery bar 64 and metering wheel 45 are visible at the top of the view shown in FIG. 1.

The present invention has solved a problem in the feeding of glass tubes to a turret type vial manufacturing machine that indexes two chucks at a time. Glass tubes can be fed to two chucks at the same time or, if because of breakage or other reasons one of the pair of simultaneously indexed chucks becomes empty before the other one, the present invention will sense the presence of an empty chuck and immediately deposit a new length of glass tubing therein.

What is claimed is:

1. An apparatus for dispensing elongate glass members to an article manufacturing machine including a support structure comprising a base plate and a top plate with interconnecting structural members attached thereto, motor means attached to said support structure, drive means coupled to said motor for operating said apparatus, cam means attached to said drive means, wheel means controlled by said cam means for engaging and advancing said glass members along a curvilinear path, means associated with said cam means for contacting said elongate glass members and thrusting them horizontally into the confinement of said manufacturing machine.

2. An apparatus for dispensing glass tube members to an article manufacturing machine including support structure comprising a base plate and a top plate with interconnecting structural members attached thereto, motor means attached to said support structure, gear means coupled to said motor means for operating said apparatus, a cam shaft coupled to said gear means, a plurality of cams interdisposed along said cam shaft, means controlled by said cams to rotate a plurality of glass tube metering wheels spaced so as to contact the extremities of said glass tube members, means associated with said metering wheels to move said glass members along an arcuate path toward an article manufacturing machine, bar means controlled by said cam means for contacting said glass tube members and translating them into the confinement of said manufacturing machine.

3. An apparatus for feeding a plurality of glass tubes to an article manufacturing machine, a support structure comprising an essentially horizontal base plate and a top plate spaced apart one from the other and interconnected by structural members attached thereto, means coupled to said base and top plates for storing glass tubes, motor means attached to said base plate, a gear train coupled to said motor means, a cam shaft aligned between said base and top plates and coupled to said gear train, a plurality of cams interdisposed along said cam shaft, a plurality of glass tube metering wheels supported from shaft means interdisposed between said plates, drive means interconnected between said cam means and said metering wheels to rotate them through a predetermined arcuate extent thus advancing a plurality of glass tubes toward an article manufacturing machine, bar means journaled adjacent said metering wheels for grasping the glass tubes, means interdisposed between said cam means and said bar means to cause said bar means to translate said glass tubes toward an article manufacturing machine, restraining means coupled to said bar means to prevent the glass tubes from inadvertently slipping from the confinement of said bar means, and means associated with said bar means to release said restraining means as said glass tubes are being translated.

4. An apparatus for feeding a plurality of long thin glass tubes to a vial manufacturing machine including a support structure comprising spaced apart essentially horizontally aligned base and top plates interconnected one with the other by upright structural members, a plurality of glass tube storage racks for holding a line of contiguously spaced vertically aligned glass tubes, motor means attached to said base plate, a plurality of vertically aligned cam shafts journaled on said base and top plates, a gear train coupled between said motor means and said cam shaft for rotating the same, a series of cams interdisposed in spaced array along said cam shafts, a plurality of pocket containing glass tube metering wheels supported from shaft means journaled in said base and top plates, said metering wheels positioned adjacent said plates and said racks, drive means interconnected between some of said cam means and said metering wheels to rotate said wheels through a predetermined arcuate extent, an arcuate support plate positioned adjacent said rack to support the ends of said glass tubes as they are translated from the rack to the location where they are thrust toward said vial manufacturing machine, pocket containing bar means journaled from a vertically aligned shaft, push rods connecting at least two of said bars, means connected between said push rods and some of said cam means to move the push rods thus activating said bar means so that a glass tube is translated, while in vertical alignment, toward a vial manufacturing machine, restraining means coupled to said bar means to prevent the glass tubes from prematurely escaping from the pockets in said bars, means associated with said bar means to release said restraining means as said glass tubes are being translated, cam means associated with switch means for controlling the sequential movement of said apparatus.

5. The method of feeding long thin glass tubes to a vial manufacturing machine including the steps of;
   a. depositing a quantity of glass tubes on a plurality of dispensing racks so that the glass tubes are parallel to and in contact with one another,
   b. advancing said glass tubes toward said vial manufacturing machine by moving said tubes one at a time through an arcuate path by means of a metering wheel
   c. grasping said glass tubes near the ends thereof by means of a plurality of holding bars and restraining fingers, and
   d. thrusting the glass tubes at least one at a time toward a vial manufacturing machine where the glass tube is restrained laterally before it drops into position under the influence of gravity.

6. The method of feeding long this glass tubes to a vial manufacturing machine including the steps of;
   a. depositing a quantity of glass tubes on two dispensing racks which form inclined planes, said glass tubes arranged in vertical alignment parallel to and in contact with one another,
   b. advancing said tubes down said inclined planes while maintaining their vertical alignment and moving said tubes one at a time through a pair of arcuate paths by means of oppositely rotating pocket containing metering wheels, c. grasping said glass tubes near the ends thereof by means of a plurality of holding bars that contain re-entrant portions adapted to fit around at least half the diametrical extent of said glass tubes, d. restraining said glass tubes within the confinement of said holding bars with restraining fingers, and e. thrusting the glass tube at least one at a time toward a vial manufacturing machine while maintaining the glass tube in vertical alignment, restraining the glass tube laterally before it drops into position under the influence of gravity.

* * * * *